US012576660B2

(12) United States Patent
Zhang

(10) Patent No.: US 12,576,660 B2
(45) Date of Patent: Mar. 17, 2026

(54) RIBBON TAKE-UP HUB FOR A PRINTER

(71) Applicant: Hand Held Products, Inc., Charlotte, NC (US)

(72) Inventor: Wenwei Zhang, Singapore (SG)

(73) Assignee: Hand Held Products, Inc., Charlotte, NC (US)

( * ) Notice: Subject to any disclaimer, the term of this patent is extended or adjusted under 35 U.S.C. 154(b) by 146 days.

(21) Appl. No.: 18/634,506

(22) Filed: Apr. 12, 2024

(65) Prior Publication Data

US 2025/0319714 A1 Oct. 16, 2025

(51) Int. Cl.

| | |
|---|---|
| ***B41J 33/00*** | (2006.01) |
| ***B41J 35/00*** | (2006.01) |
| ***B65H 75/24*** | (2006.01) |
| ***B65H 75/28*** | (2006.01) |

(52) U.S. Cl.

CPC .......... *B41J 33/006* (2013.01); *B65H 75/248* (2013.01); *B65H 75/28* (2013.01); *B65H 2405/451* (2013.01); *B65H 2405/453* (2013.01)

(58) Field of Classification Search

None

See application file for complete search history.

(56) References Cited

U.S. PATENT DOCUMENTS 5,995,128 A * 11/1999 Adams .................... B41J 2/355 242/415.1
2018/0326765 A1* 11/2018 Ji .......................... B65H 16/04
2022/0135366 A1* 5/2022 Thenemann ....... B65H 75/4428 160/24

FOREIGN PATENT DOCUMENTS

JP 06-127064 A 5/1994
JP 3776509 B2 5/2006
JP 4632969 B2 2/2011
JP 6190717 B2 8/2017

* cited by examiner

*Primary Examiner* — Scott A Richmond
(74) *Attorney, Agent, or Firm* — Alston & Bird LLP

(57) ABSTRACT

A ribbon take-up hub for a printer is disclosed. The ribbon take-up hub comprises a centre hub configured to be coupled to a rotatable component of the printer. The centre hub comprising a button. Further, one or more arc shaped blocks are positioned in proximity to the centre hub, and a plurality of tension holders are attached to the centre hub. Further, upon pressing of the button, the plurality of tension holders retracts inside the centre hub to facilitate placement and winding of a ribbon between the plurality of tension holders and the one or more arc shaped blocks. Further, upon releasing the button, the plurality of tension holders extends from the centre hub to clamp the winded ribbon between the plurality of tension holders and the one or more arc shaped blocks.

20 Claims, 4 Drawing Sheets

RIBBON TAKE-UP HUB FOR A PRINTER

TECHNOLOGICAL FIELD

Example embodiments of the present disclosure relate generally to a media hub, and more particularly relates to a ribbon take-up hub for a printer.

BACKGROUND

A ribbon take-up roller in printers plays a crucial role in maintaining ribbon movement during printing operations of the printers. The ribbon take-up roller serves to wind used ribbons and maintain tension in the ribbon during the printing operation of the printers. Conventionally, current designs of the ribbon take-up roller require an empty ribbon core on the ribbon take-up roller, as the current ribbon take-up roller does not come with the ribbon. Further, while loading the ribbon core, users directly tie the ribbon to the ribbon take-up roller. Such direct tying of the ribbon to the take-up roller often leads to complications during removal of the used ribbons and potential damage to the printers.

Applicant has identified a number of deficiencies and problems, and through applied effort, ingenuity, and innovation, many of these identified problems have been solved by developing solutions that are included in embodiments of the present disclosure, many examples of which are described in detail herein.

BRIEF SUMMARY

The following presents a simplified summary to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In an example embodiment, a ribbon take-up hub for a printer is disclosed. The ribbon take-up hub comprises a centre hub configured to be coupled to a rotatable component of the printer, the centre hub comprising a button. Further, one or more arc shaped blocks are positioned in proximity to the centre hub and a plurality of tension holders are attached to the centre hub. Further, upon pressing of the button, the plurality of tension holders retracts inside the centre hub to facilitate placement and winding of a ribbon between the plurality of tension holders and the one or more arc shaped blocks. Further, upon releasing the button, the plurality of tension holders extends from the centre hub to clamp the winded ribbon between the plurality of tension holders and the one or more arc shaped blocks.

In some embodiments, the plurality of tension holders comprises a first pair of tension holders and a second pair of tension holders. Further, each tension holder of the first pair of tension holders is positioned ninety degrees from each tension holder of the second pair of tension holders relative to a centre of the centre hub. In some embodiments, the first pair of tension holders are configured to clamp the ribbon between the first pair of tension holders and the one or more arc shaped blocks to facilitate rolling of the ribbon during a printing operation.

In some embodiments, the second pair of tension holders are configured to control tension on the ribbon that is rolled over the plurality of tension holders. In some embodiments, upon pressing the button, the plurality of tension holders retracts inside the centre hub to loosen tension on the ribbon and to facilitate removal of the ribbon from the ribbon take-up hub. In some embodiments, the button is a spring-loaded button that is configured to self-release once a pressure applied by a user over the button is released.

In some embodiments, the centre hub defines a rotating axis and the centre hub is configured to rotate on the rotating axis to wind the ribbon around the centre hub. In some embodiments, the one or more arc shaped blocks are positioned in proximity to the first pair of tension holders to form a gap for positioning the ribbon. In some embodiments, width of the at least one gap is greater than an overall thickness of the ribbon to accommodate the ribbon over the centre hub.

In another example embodiment, a method is disclosed. The method comprises of retracting, upon pressing a button, a plurality of tension holders inside a centre hub to facilitate placement and winding of a ribbon between the plurality of tension holders and one or more arc shaped blocks. Further, the one or more arc shaped blocks are positioned in proximity to the centre hub. Further, the plurality of tension holders are attached to the centre hub. The method further comprises extending, upon releasing the button, the plurality of tension holders from the centre hub to clamp the winded ribbon between the plurality of tension holders and the one or more arc shaped blocks.

The above summary is provided merely for purposes of summarizing some exemplary embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained within the following detailed description and its accompanying drawings.

BRIEF DESCRIPTION OF THE DRAWINGS

Figure 1:
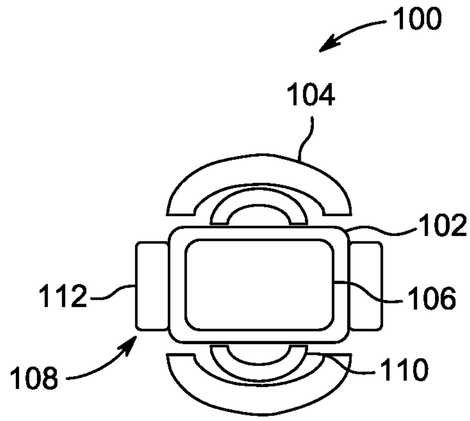
Figure 2A:
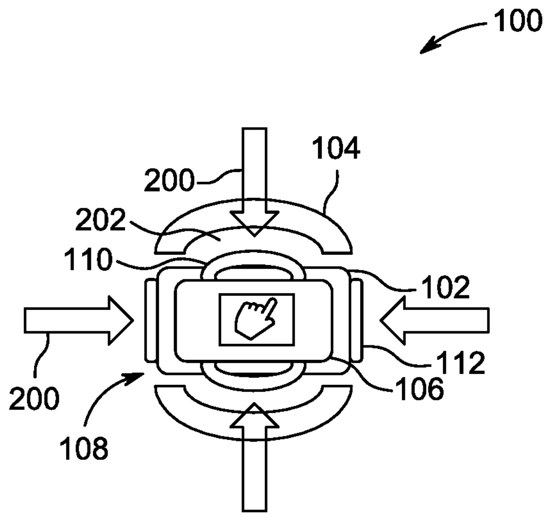
Figure 2B:
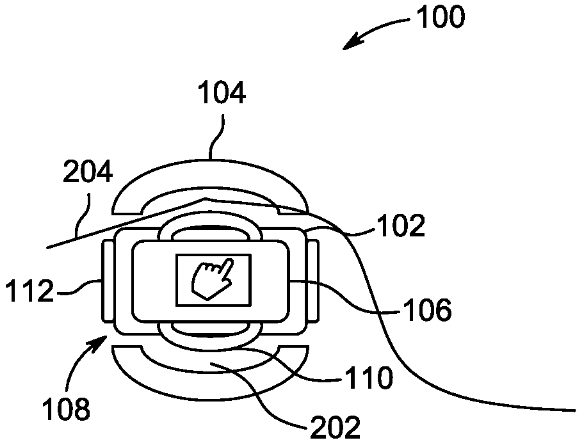
Figure 2C:
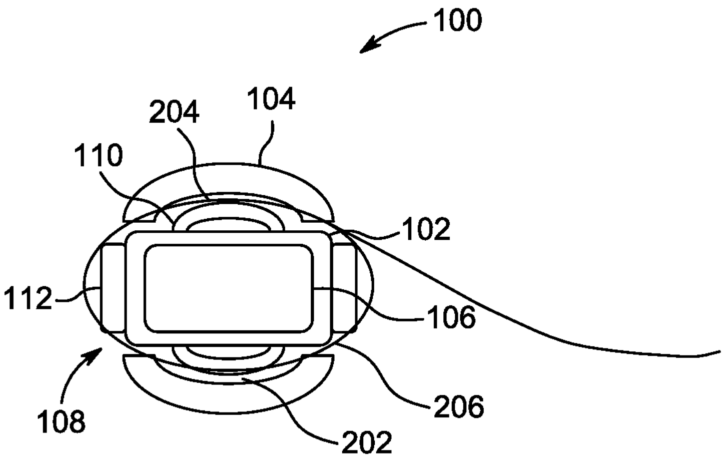
Figure 3A:
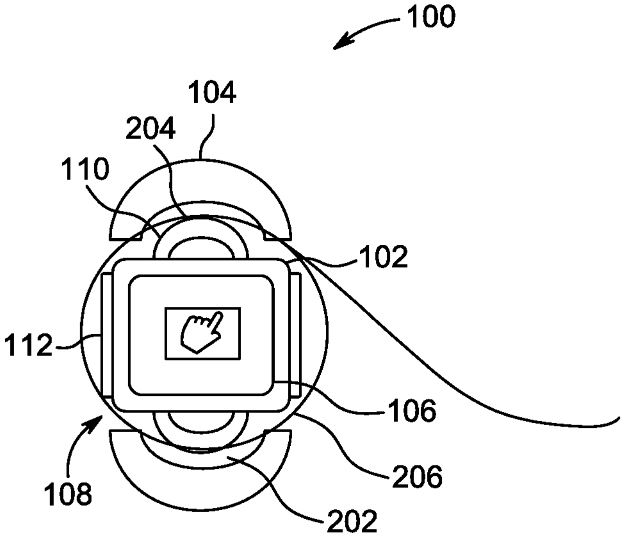
Figure 3B:
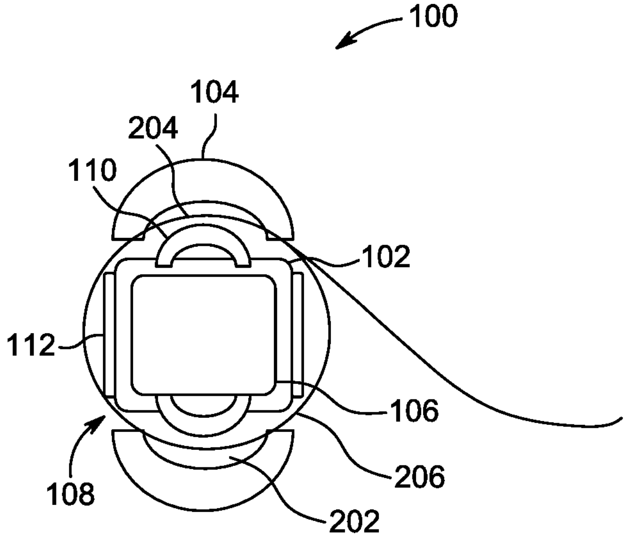
Figure 4:
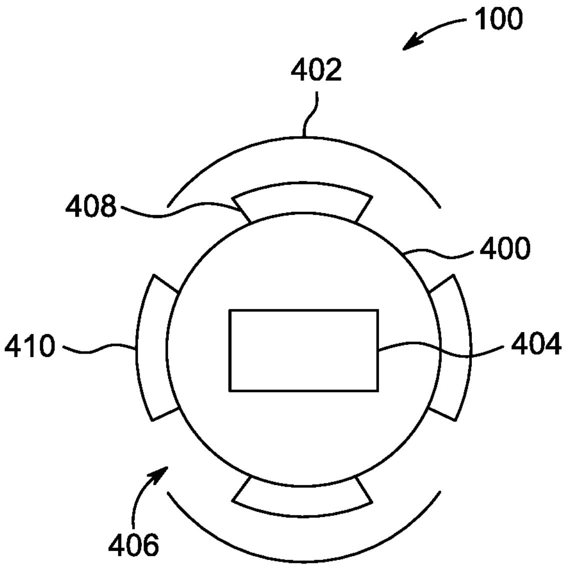

Having thus described certain example embodiments of the present disclosure in general terms, reference will hereinafter be made to the accompanying drawings, which are not necessarily drawn to scale, and wherein:

FIG. 1 illustrates a schematic view of a ribbon take-up hub for a printer in an example embodiment of the present disclosure;

FIG. 2A illustrates another schematic view of the ribbon take-up hub during retraction of a plurality of tension holders in accordance with an example embodiment of the present disclosure;

FIG. 2B illustrates another schematic view of the ribbon take-up hub during placement of a ribbon between the plurality of tension holders and one or more arc shaped blocks in accordance with an example embodiment of the present disclosure;

FIG. 2C illustrates another schematic view of the ribbon take-up hub during winding of the of the ribbon between the plurality of tension holders and the one or more arc shaped blocks in accordance with an example embodiment of the present disclosure;

FIG. 3A illustrates another schematic view of the ribbon take-up hub during pressing of the button to remove the winded ribbon in accordance with the example embodiment of the present disclosure;

FIG. 3B illustrates another schematic view of the ribbon take-up hub during removing of the winded ribbon from the centre hub in accordance with the example embodiment of the present disclosure; and FIG. 4 illustrates another schematic view of the ribbon take-up hub in accordance with an example embodiment of the present disclosure.

DETAILED DESCRIPTION

The exemplary embodiments described herein provide detail for illustrative purposes and are subject to many variations in structure and design. It should be appreciated, however, that the embodiments are not limited to a particularly disclosed embodiment shown or described. It is understood that various omissions and substitutions of equivalents are contemplated as circumstances may suggest or render expedient, but these are intended to cover the application or implementation without departing from the spirit or scope of the claims.

Also, it is to be understood that the phraseology and terminology used herein is for the purpose of description and should not be regarded as limiting. The terms "a," "an," and "the" herein do not denote a limitation of quantity, but rather denote the presence of at least one of the referenced object. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Like numerals represent like parts in the figures.

Embodiments of the present disclosure will be described more fully hereinafter with reference to the accompanying drawings in which like numerals represent like elements throughout the several figures, and in which example embodiments are shown. Embodiments of the present disclosure may, however, be embodied in alternative forms and should not be construed as being limited to the embodiments set forth herein. The examples set forth herein are non-limiting examples and are merely examples among other possible examples.

The present disclosure provides various embodiments of a ribbon take-up hub for a printer. Embodiments may comprise a centre hub that may be configured to be coupled to a rotatable component of the printer. Embodiments may further comprise a button. Embodiments may comprise one or more arc shaped blocks that may be positioned in proximity to the centre hub. Embodiments may comprise a plurality of tension holders that may be attached to the centre hub. Embodiments may be configured to retract the plurality of tension holders inside the centre hub, upon pressing of the button to facilitate placement and winding of a ribbon between the plurality of tension holders and the one or more arc shaped blocks. Embodiments may be configured to extend the plurality of tension holders from the centre hub, upon releasing of the button to clamp the winded ribbon between the plurality of tension holders and the one or more arc shaped blocks.

FIG. 1 illustrates a schematic view of a ribbon take-up hub 100 for a printer, in accordance with an example embodiment of the present disclosure.

In some embodiments, the ribbon take-up hub 100 may comprise a centre hub 102, one or more arc shaped blocks 104 that may be positioned in proximity to the centre hub 102, a button 106, and a plurality of tension holders 108. In some embodiments, the centre hub 102 may be configured to be coupled to a rotatable component (not shown) of the printer (not shown). In at least one example, the rotatable component may correspond to a main holder (not shown) of the printer (not shown). In another example, the rotatable component may correspond to a media holder (not shown) of the printer (not shown). In some embodiments, the centre hub 102 may be crafted with a shape that may include, but not limited to a circular shape, a rectangular shape, a square shape or like.

In some embodiments, the centre hub 102 may be configured to provide an enclosed structure that facilitates integration of one or more electronic, electrical, or mechanical components associated with the ribbon take-up hub 100. In some embodiments, the centre hub 102 may be crafted with a material that may be selected from a group of materials such as, but not limited to iron, steel, polymer or like. In some embodiments, the centre hub 102 may define a centre hub axis. In some embodiments, the centre hub 102 may be crafted in any shape known in the art.

In some embodiments, the one or more arc shaped blocks 104 may be positioned in proximity to the centre hub 102. In at least one example, the one or more arc shaped blocks 104 may be directly coupled with the centre hub 102 using one or more coupling elements (not shown). In at least another example, the one or more arc shaped blocks 104 may be indirectly coupled with the centre hub 102 through the main holder. In some embodiments, the one or more arc shaped blocks 104 may be arranged in proximity to the centre hub 102 such that the centre hub 102 may be positioned in between the one or more arc shaped blocks 104. In some embodiments, the one or more arc shaped blocks 104 may be connected with the main holder of the printer.

Further, the one or more arc shaped blocks 104 may be configured to remain stationary during loading or unloading of a ribbon (not shown) on the ribbon take-up hub 100. In at least one example, the one or more arc shaped blocks 104 may comprise one or more locks (not shown). Further, the one or more locks may be configured to facilitate integration of the ribbon take-up hub 100 into the main holder of the printer. Further, the one or more locks may be configured to engage into one or more grooves (not shown) constructed on the main holder of the printer. In some embodiments, engaging of the one or more locks into the one or more grooves may result in locking of the one or more arc shaped blocks 104 with the main holder of the printer.

In some embodiments, the one or more arc shaped blocks 104 may be crafted with a material that may be selected from a group of materials such as, but not limited to iron, steel, polymer of ethane or any other material known in the art. In some embodiments the one or more arc shaped blocks 104 may be configured to facilitate winding of the ribbon around the plurality of tension holders 108. Further, the angle of curvature of the one or more arc shaped blocks 104 may be selected in a view that facilitate proper winding of an optimum length of the ribbon.

In some embodiments, centre hub 102 may further comprise the button 106. In at least one example, the button 106 may be installed over a central portion of the centre hub 102 of the ribbon take-up assembly. In at least another example, the button 106 may be installed on the printer. Further, the button 106 may correspond to at least one of a one-way button or a two-way button. In some embodiments, the button 106 may correspond to a spring loaded button. Further, the spring loaded button may be configured to self-release once a pressure applied by a user over the button 106 is released.

In some other embodiments, the button 106 may be integrated into at least one electrical circuit that may be installed within the printer. Further, the electrical circuit may comprise a power source, the button 106 and one or more electrical components and/or one or more electronic components housed inside the printer. In some embodiments, pressing of the button 106 may be configured to complete the at least one electrical circuit. Further, the power source may be configured to supply electric current to the one or more electrical components and/or the one or more electronic components, upon pressing of the button 106 by the user. In some embodiments, releasing of the button 106 may be configured to break the at least one electrical circuit. Further, the power source may be configured to stop the electric current supplied to the one or more electrical components and/or the one or more electronic components, upon releasing of the button 106 by the user.

As illustrated in FIG. 1, the ribbon take-up hub 100 may further comprise the plurality of tension holders 108. In some embodiments, the plurality of tension holders 108 may be attached to the centre hub 102. In some embodiments, the plurality of tension holders 108 may be crafted with a shape that may be selected from a group of shapes such as, but not limited to a curve shape, rectangular shape, or like. In some embodiments, the plurality of tension holders 108 may comprise a first pair of tension holders 110 and a second pair of tension holders 112. In some embodiments, each tension holder 110 of the first pair of tension holders 110 may be positioned in proximity with a corresponding arc shaped block 104 of the one or more arc shaped blocks 104. In some embodiments, each of the first pair of tension holders 110 may be positioned approximately ninety degrees (e.g., within manufacturing or engineering tolerances, such as within 5 degrees) from each tension holder of the second pair of tension holders 112 relative to a centre of the centre hub 102.

In some embodiments, each of the plurality of tension holders 108 may be configured to retract inside the centre hub 102. Further, each of the plurality of tension holders 108 may be configured to extend from the centre hub 102. In some embodiments, each of the first pair of tension holders 110 may extend towards a corresponding arc shaped block 104 of the one or more arc shaped blocks 104. In some embodiments, when the button 106 is pressed by the user upon application of an external force, such as a force exerted by a user's finger, the plurality of tension holders 108 may be configured to retract inside the centre hub 102. In some embodiments, the retraction of the plurality of tension holders 108 may be configured to facilitate placement and winding of the ribbon between the plurality of tension holders 108 and the one or more arc shaped blocks 104. In some embodiments, when the button 106 may be released by the user, the first pair of tension holders 110 may be configured to extend from the centre hub 102, and towards the one or more arc shaped blocks 104.

FIG. 2A illustrates another schematic view of the ribbon take-up hub 100 during retraction of the plurality of tension holders 108, in accordance with an example embodiment of the present disclosure. FIG. 2B illustrates another schematic view of the ribbon take-up hub 100 during placement of the ribbon between the plurality of tension holders 108 and the one or more arc shaped blocks 104, in accordance with an example embodiment of the present disclosure. FIG. 2C illustrates another schematic view of the ribbon take-up hub 100 during winding of the of the ribbon between the plurality of tension holders 108 and the one or more arc shaped blocks 104, in accordance with an example embodiment of the present disclosure.

In some embodiments, the button 106 may be operationally paired with the plurality of tension holders 108. Further, the button 106 may be accessed by the user to control extension and retraction of the plurality of tension holders 108, as illustrated by an arrow 200. In some embodiments, the button 106 may be pressed by the user to provide an input command that may direct retraction of the plurality of tension holders 108. Further, the button 106 may be released by the user to provide another input command that may direct extension of the plurality of tension holders 108.

In some embodiments, the plurality of tension holders 108 may be configured to extend from the centre hub 102, and towards the one or more arc shaped blocks 104. Further, the plurality of tension holders 108 may be configured to retract inside the centre hub 102. In some embodiments, the plurality of tension holders 108 may be coupled with one or more actuators (not shown). Further, the one or more actuators may be configured to facilitate extension or retraction of the plurality of tension holders 108. In some embodiments, a linear displacement during extension or retraction of the plurality of tension holders 108 may be provided by the one or more actuators. In some embodiments, the one or more actuators may correspond to at least one of a lead and screw arrangement, an electromagnetically operated spring arrangement or any other arrangement known in the art.

In at least one example, the one or more actuators may correspond to the lead and screw arrangement, the plurality of tension holders 108 may be configured to move a linear direction during actuation of the one or more actuators. In some embodiments, the lead and screw arrangement comprise a motor-powered screw and a lead. Further, the lead may be attached with the plurality of tension holders 108 and the motor-powered screw may be housed inside the centre hub 102. Further, the motor-powered screw may be configured to rotate in a clockwise or counter clockwise direction. In some embodiments, the rotations of the motor-powered screw in the clockwise direction may result in retraction of the plurality of tension holders 108. Further, the rotations of the motor-powered screw in the counter-clockwise direction may result in extension of the plurality of tension holders 108.

In at least another example, when the one or more actuators may correspond to the electromagnetically operated spring arrangement, the plurality of tension holders 108 may be configured to move in a linear direction during actuation of the electromagnetically operated spring arrangement. Further, the electromagnetically operated spring arrangement may comprise a coil, a ferromagnetic core, and a spring. In some embodiments, the coil may be configured to generate a magnetic field around the ferromagnetic core, upon supplied with a pre-defined voltage. Further, the spring may be configured to compress or expand due to the magnetic field generated by the coil around the ferromagnetic core. In some embodiments, the spring may be operationally coupled with the plurality of tension holders 108. Further, the expansion or compression of the spring may be configured to provide a linear movement to the plurality of tension holders 108.

In some embodiments, the plurality of tension holders 108 may comprise the first pair of tension holders 110 and the second pair of tension holders 112. In some embodiments, the first pair of tension holder that may be positioned in proximity to the one or more arc shaped blocks 104 to form a gap 202 as shown in FIG. 2A. In some embodiments, the gap 202 may be configured to accommodate the ribbon. Further, the gap 202 may define a width of Z mm.

As illustrated in FIG. 2B, the gap 202 may be accessed by the user to place a ribbon 204. In some embodiments, the gap 202 may be configured to provide sufficient space to accommodate the ribbon 204. In some embodiments, the ribbon 204 may comprise a first end that may be placed by the user inside the gap 202. In at least an example, the gap 202 may accommodate the first end of the ribbon 204 during loading and winding of the ribbon 204 around the centre hub 102. In at least another example, the gap 202 may be configured to accommodate a loop 206 of the ribbon 204 that may be winded by the user around the plurality of tension holders 108, as illustrated in FIG. 2C.

In some embodiments, the button 106 may be released by the user to facilitate clamping of the first end of the ribbon 204 between the first pair of tension holders 110 of the plurality of tension holders 108 and the one or more arc shaped blocks 104. In some other embodiments, the button 106 may be released by the user to facilitate clamping of the loop 206 of the ribbon 204 between the first pair of tension holders 110 and the one or more arc shaped blocks 104, as illustrated in FIG. 2C. In some embodiments, the clamping of the ribbon 204 between the first pair of tension holders 110 and the one or more arc shaped blocks 104 may facilitate rolling of the ribbon 204 around the plurality tension holders during a printing operation of the printer.

In some embodiments, the ribbon 204 may be configured to wind around the centre hub 102 and the plurality of tension holders 108 during the printing operation of the printer. In some embodiments, the centre hub 102 defines a rotating axis. Further, the centre hub 102 may be configured to rotate on the rotating axis to wind the ribbon 204 around the centre hub 102 and the plurality of tension holders 108. In some embodiments, upon winding of the ribbon 204 around the centre hub 102, the second pair of tension holders 112 of the plurality of tension holders 108 may be configured to control tension on the ribbon 204 that may be rolled over the plurality of tension holders 108.

FIG. 3A illustrates another schematic view of the ribbon take-up hub 100 during pressing of the button 106 to remove the winded ribbon 204, in accordance with an example embodiment of the present disclosure. FIG. 3B illustrates another schematic view of the ribbon take-up hub 100 during removing of the winded ribbon 204 from the centre hub 102, in accordance with an example embodiment of the present disclosure. FIGS. 3A-3B are described in conjunction with FIGS. 1-2C.

In some embodiments, the button 106 may be pressed by the user to initiate removal of the ribbon 204 winded around the centre hub 102. Further, upon pressing of the button 106, the plurality of tension holders 108 may be configured to retract inside the centre hub 102 that releases tension from the ribbon 204 winded around the centre hub 102, as illustrated in FIG. 3A. Further, the plurality of tension holders 108 may be configured to retract inside the centre hub 102 to create the gap 202. In some embodiments, the gap 202 may be configured to facilitate removing of the ribbon 204 from the centre hub 102, as illustrated in FIG. 3B.

In some embodiments, upon retraction of the plurality of tension holders 108, the gap 202 may be created between the one or more arc shaped blocks 104 and the first pair of tension holders 110. Further, the retraction of the second pair of tension holders 112 may be configured to release the tension on the ribbon 204. The gap 202 between the one or more arc shaped blocks 104 and the first pair of tension holders 110, further the release of the tension may facilitate to remove the ribbon 204 from the centre hub 102.

FIG. 4 illustrates another schematic view of the ribbon take-up hub 100, in accordance with an example embodiment of the present disclosure. FIG. 4 is described in conjunction with FIGS. 1-3B.

In one embodiment, the ribbon take-up hub 100 may comprise a centre hub 400, one or more arc shaped blocks 402, a button 404, a plurality of tension holders 406 having a first pair of tension holders 408 and a second pair of tension holders 410. In some embodiments, the centre hub 400 may be configured to be connected with the main holder of the printer. Further, the centre hub 400 may be crafted with a shape that may correspond to the circular shape, as illustrated in FIG. 4. In some embodiments, the centre hub 400 may define a radius of curvature Y mm. Further, the centre hub 400 may be configured to accommodate the ribbon 204 during printing operation of the printer.

In some embodiments, the one or more arc shaped blocks 402 may be positioned in proximity to the centre hub 400. Further, the one or more arc shaped blocks 402 may be connected with the main holder of the printer. Further, the one or more arc shaped blocks 402 may be configured to remain stationary during winding of the ribbon 204 around the centre hub 400. In some embodiments, the centre hub 400 may be installed with the button 404. Further, the button 404 may be pressed or released by the user upon application of an external force. In some embodiments, the button 404 may be electrically coupled with a power source (not shown). Further, pressing of the button 404 may facilitate supply of an electrical current from the power source to an electrical circuit paired with the button 404.

In some embodiments, the plurality of tension holders 406 may be configured to extend from the centre hub 400, and towards the one or more arc shaped blocks 402. Further, the plurality of tension holders 406 may be configured to retract inside the one or more arc shaped blocks 402. In some embodiments, the button 404 may be pressed or released by the user to control extension and retraction of the plurality of tension holders 406. In some embodiments, the plurality of tension holders 406 may comprise the first pair of tension holders 408 and the second pair of tension holders 410. In some embodiments, the first pair of tension holders 408 may be configured to clamp the ribbon 204 during winding of the ribbon 204 around the centre hub 400. Further, the second holder may be configured to control tension on the ribbon 204 that may be roller over the plurality of tension holders 406 during the printing operation of the printer.

In an example embodiment, a method is disclosed. The method comprises one or more operations to wind the ribbon 204 around the plurality of tension holders 108. At one operation, the plurality of tension holders 108 may be configured to retract inside the centre hub 102 to enable placement and winding of the ribbon 204 between at least some of the plurality of tension holders 108 and corresponding arc shaped blocks 104 of the one or more arc shaped blocks 104, upon pressing of the button 106. Further, the one or more arc shaped blocks 104 may be positioned in proximity to the centre hub 102. Further, the plurality of tension holders 108 may be attached to the centre hub 102. Further, the plurality of tension holders 108 may comprise the first pair of tension holders 110 and the second pair of tension holders 112. The button 106 may be pressed by the user to provide the input command to wind the ribbon 204 around the plurality of tension holders 108. Further, the plurality of tension holders 108 may be configured to retract inside the centre hub 102 to form the gap 202. Further, the gap 202 may be accessed by the user to place the ribbon 204.

For example, a ribbon take-up hub 100 is engaged with a main holder of a printer. Further, the ribbon take-up hub 100 comprises a centre hub 102, one or more arc shaped blocks 104, a button 106, a plurality of tension holders 108 having a first pair of tension holders 110 and a second pair of tension holders 112. Further, the button 106 may be pressed by a user to direct the plurality of tension holders 108 to retract inside the centre hub 102 that forms gap 202 between the plurality of tension holders 108 and the one or more arc shaped blocks 104. Further, the gap 202 may be accessed by a user to place or wind a ribbon 204 around the centre hub 102 to facilitate winding of the ribbon 204 around the centre hub 102 and the plurality of tension holders 108 during a printing operation of the printer.

At another operation, the plurality of tension holders 108 may be configured to extend to from the centre hub 102 to clamp the winded ribbon 204 between the plurality of tension holders 108 and the one or more arc shaped blocks 104. Further, the plurality of tension holders 108 may comprise the first pair of tension holders 110 and the second pair of tension holders 112. Further, the first pair of tension holders 110 may be configured to extend from the centre hub 102, and towards the one or more arc shaped blocks 104 to clamp the winded ribbon 204. Further, the second pair of tension holders 112 may be configured to control on the ribbon 204 that may be winded around the plurality of tension holders 108.

For example, the button 106 is released by the user to ensure clamping of the ribbon 204 between at least some of the plurality of tension holders 108 and corresponding arc shaped blocks 104 of the one or more arc shaped blocks 104. Further, upon releasing of the button 106, a first pair of tension holders 110 of the plurality of tension holders 108 clamps the ribbon 204 between the plurality of tension holders 108 and the one or more arc shaped blocks 104. Further, upon releasing of the button 106, a second pair of tension holders 112 of the plurality of tension holders 108 controls tension on the ribbon 204 that is rolled over the plurality of tension holders 108 by extending towards the winded ribbon 204.

The present invention provides various embodiments of a ribbon take-up hub 100. Embodiments may facilitate hassle free replacement or loading of the ribbon 204 on the ribbon take-up hub 100 by ensuring clamping of the ribbon 204 through the plurality of tension holders 108. Embodiments may prevent any malfunction or downtime during printing the printer. Embodiments may ensure proper tension on the ribbon 204 while loading the ribbon 204 around the centre hub 102 through extension of the second pair of tension holders 112 of the plurality of tension holders 108. Embodiments may ensure a minimal manual involvement during loading or unloading of the ribbon 204 around the centre hub 102. Embodiments may enhance efficiency of the printer while performing the printing operation.

As will be appreciated by one skilled in the art, aspects of the present disclosure may be embodied as a system, method, or computer program product. Accordingly, aspects of various embodiments may take the form of an entirely hardware embodiment, an entirely software embodiment (including firmware, resident software, micro-code, etc.) or an embodiment combining software and hardware aspects that may all generally be referred to herein as a "circuit," "module", "system" or "sub-system." In addition, aspects of the present disclosure may take the form of a computer program product embodied in one or more computer readable medium(s) having computer readable program code embodied thereon.

The foregoing descriptions of specific embodiments have been presented for purposes of illustration and description. They are not intended to be exhaustive or to limit the embodiments to the precise forms disclosed, and obviously many modifications and variations are possible in light of the above teaching. The embodiments were chosen and described in order to best explain principles and practical applications thereof, and to thereby facilitate others skilled in the art to best utilize the various embodiments with various modifications as are suited to the particular use contemplated. It is understood that various omissions and substitutions of equivalents are contemplated as circumstances may suggest or render expedient, but these are intended to cover the application or implementation without departing from the spirit or scope of the claims. The following claims are in no way intended to limit the scope of embodiments to the specific embodiments described herein.

What is claimed is:

1. A ribbon take-up hub for a printer, the ribbon take-up hub comprising:

a centre hub configured to be coupled to a rotatable component of the printer, the centre hub comprising a button;

one or more arc shaped blocks positioned in proximity to the centre hub; and a plurality of tension holders attached to the centre hub, wherein upon pressing of the button, the plurality of tension holders retracts inside the centre hub to facilitate placement and winding of a ribbon between the plurality of tension holders and the one or more arc shaped blocks, and wherein upon releasing the button, the plurality of tension holders extends from the centre hub to clamp the wound ribbon between the plurality of tension holders and the one or more arc shaped blocks.

2. The ribbon take-up hub of claim 1, wherein the plurality of tension holders comprises a first pair of tension holders and a second pair of tension holders.

3. The ribbon take-up hub of claim 2, wherein each tension holder of the first pair of tension holders is positioned ninety degrees from each tension holder of the second pair of tension holders relative to a centre of the centre hub.

4. The ribbon take-up hub of claim 2, wherein the first pair of tension holders is configured to clamp the ribbon between the first pair of tension holders and the one or more arc shaped blocks to facilitate rolling of the ribbon during a printing operation.

5. The ribbon take-up hub of claim 2, wherein the second pair of tension holders is configured to control tension on the ribbon that is rolled over the plurality of tension holders.

6. The ribbon take-up hub of claim 1, wherein upon pressing the button, the plurality of tension holders retract inside the centre hub to loosen tension on the ribbon and to facilitate removal of the ribbon from the ribbon take-up hub.

7. The ribbon take-up hub of claim 1, wherein the button is a spring-loaded button that is configured to self-release once a pressure applied by a user over the button is released.

8. The ribbon take-up hub of claim 1, wherein the centre hub defines a rotating axis and the centre hub is configured to rotate on the rotating axis to wind the ribbon around the centre hub.

9. The ribbon take-up hub of claim 2, wherein the one or more arc shaped blocks are positioned in proximity to the first pair of tension holders to form a gap for positioning the ribbon.

10. The ribbon take-up hub of claim 9, wherein a width of the gap is greater than an overall thickness of the ribbon to accommodate the ribbon over the centre hub.

11. A method comprising:

retracting, upon pressing a button, a plurality of tension holders inside a centre hub to enable placement and winding of a ribbon between the plurality of tension holders and one or more arc shaped blocks, wherein the one or more arc shaped blocks are positioned in proximity to the centre hub, and wherein the plurality of tension holders is attached to the centre hub; or extending, upon releasing the button, the plurality of tension holders from the centre hub to clamp the wound ribbon between the plurality of tension holders and the one or more arc shaped blocks.

12. The method of claim 11, wherein the centre hub is configured to be coupled to a rotatable component of a printer and the centre hub comprises the button.

13. The method of claim 11, wherein the plurality of tension holders comprises a first pair of tension holders and a second pair of tension holders.

14. The method of claim 13, wherein each tension holder of the first pair of tension holders is positioned ninety degrees from each tension holder of the second pair of tension holders relative to a centre of the centre hub.

15. The method of claim 13 further comprising clamping, via the first pair of tension holders, the ribbon between the first pair of tension holders and the one or more arc shaped blocks to facilitate rolling of the ribbon during a printing operation.

16. The method of claim 13 further comprising controlling, via the second pair of tension holders, tension on the ribbon that is rolled over the plurality of tension holders.

17. The method of claim 11, wherein upon pressing the button, the plurality of tension holders retracts inside the centre hub to loosen tension on the ribbon and to facilitate removal of the ribbon from a ribbon take-up hub.

18. The method of claim 11, wherein the button is a spring-loaded button that is configured to self-release once a pressure applied by a user over the button is released.

19. The method of claim 11, wherein the centre hub defines a rotating axis and the centre hub is configured to rotate on the rotating axis to wind the ribbon around a centre of the centre hub.

20. The method of claim 13, wherein the one or more arc shaped blocks are positioned in proximity to the first pair of tension holders to form a gap for positioning the ribbon.

* * * * *